United States Patent
Kashyap

(10) Patent No.: US 8,375,228 B2
(45) Date of Patent: Feb. 12, 2013

(54) MULTIPLE-NODE SYSTEM POWER UTILIZATION MANAGEMENT

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 12/187,231

(22) Filed: Aug. 6, 2008

(65) Prior Publication Data

US 2010/0037077 A1    Feb. 11, 2010

(51) Int. Cl.
*G02B 6/12* (2006.01)

(52) U.S. Cl. ........ 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 6,986,069 B2 | 1/2006 | Oehler et al. | |
| 7,539,881 B2 * | 5/2009 | Shaw et al. | 713/300 |
| 7,580,321 B2 * | 8/2009 | Fujisawa et al. | 365/233.1 |
| 7,702,931 B2 * | 4/2010 | Goodrum et al. | 713/300 |
| 7,739,548 B2 * | 6/2010 | Goodrum et al. | 714/20 |
| 7,757,107 B2 * | 7/2010 | Goodrum et al. | 713/320 |
| 2004/0163001 A1 * | 8/2004 | Bodas | 713/300 |
| 2005/0049758 A1 * | 3/2005 | Lehr et al. | 700/291 |
| 2006/0053324 A1 | 3/2006 | Giat et al. | |
| 2006/0161794 A1 | 7/2006 | Chiasson et al. | |
| 2006/0248362 A1 | 11/2006 | Kasek et al. | |
| 2007/0110360 A1 * | 5/2007 | Stanford | 385/14 |
| 2007/0245161 A1 * | 10/2007 | Shaw et al. | 713/300 |
| 2007/0271477 A1 | 11/2007 | Brewer et al. | |
| 2008/0222435 A1 * | 9/2008 | Bolan et al. | 713/310 |
| 2009/0150693 A1 | 6/2009 | Kashyap et al. | |
| 2009/0193276 A1 * | 7/2009 | Shetty et al. | 713/340 |
| 2010/0049999 A1 * | 2/2010 | Hansalia | 713/300 |

* cited by examiner

*Primary Examiner* — M Elamin
(74) *Attorney, Agent, or Firm* — Steven L. Bennett

(57) ABSTRACT

A multiple-node system having a number of nodes has its power utilization managed. A node power cap of a node specifies a maximum power that the node is individually able to utilize. A system-wide power cap specifies a maximum power that the multiple-node system is able to utilize overall. In response to determining that a node power cap of a selected node is to be increased, where a total of the node power caps of all the nodes is equal to the system-wide power cap, the node power caps of one or more nodes are reduced so that the total of the node power caps of all the nodes is less than the system-wide power cap. The node power cap of the selected node is then increased such that the total of the node power caps of all the nodes is equal to or less than the system-wide power cap.

10 Claims, 3 Drawing Sheets

MULTIPLE-NODE SYSTEM POWER UTILIZATION MANAGEMENT

FIELD OF THE INVENTION

The present invention relates generally to managing power utilization of a multiple-node system, and more particularly to increasing the individual power cap of a selected node while still ensuring that a system-wide power cap is not violated.

BACKGROUND OF THE INVENTION

A data center can include tens, hundreds, or even thousands of computing devices that are managed at a single location. Such large numbers of computing devices can consume large amounts of power. The cost of power, however, continues to increase. Therefore, data center operators are attempting to better manage the power utilized by the computing devices of their data centers. Such attempts are also being made in response to customers requesting that the power consumed by their computing devices be better managed, as well as in response to requirements promulgated by various governmental agencies throughout the world. However, such power management may desirably not come at a cost of reduced performance of the computing devices in completing the tasks assigned to them.

SUMMARY OF THE INVENTION

The present invention relates to managing the power utilized by a multiple-node system that has a number of nodes. A method of one embodiment thus manages the power utilized by such a multiple-node system. Each node has a node power cap that specifies the maximum power that the node is individually able to utilize. The multiple-node system as a whole has a system-wide power cap that specifies the maximum power that the multiple-node system is able to utilize overall. The method determines that a node power cap of a selected node is to be increased. In response, where the total of the node power caps of all the nodes is equal to the system-wide power cap, the node power caps of one or more nodes are reduced so that the total of the node power caps of all the nodes is less than the system-wide power cap. The node power cap of the selected node is then increased, such that the total of the node power caps of all the nodes is equal to or less than the system-wide power cap.

A multiple-node system of an embodiment of the invention includes a number of nodes and a management component. Each node has a node power cap that specifies the maximum power that the node is individually able to utilize. The multiple-node system as a whole has a system-wide power cap that specifies the maximum power that the multiple-node system is able to utilize overall. The management component determines that a node power cap of a selected node is to be increased. In response, where the total of the node power caps of all the nodes is equal to the system-wide power cap, the management component reduces the node power caps of one or more nodes so that the total of the node power caps of all the nodes is less than the system-wide power cap. The management component then increases the node power cap of the selected node, such that the total of the node power caps of all the nodes is equal to or less than the system-wide power cap.

An article of manufacture includes a tangible computer-readable medium, and means in the medium. For instance, the tangible computer-readable medium may be a recordable data storage medium. The means in the medium may include one or more computer programs that can be executed by one or more processors. The means is for managing power utilization of a multiple-node system having a number of nodes. The means determines that a node power cap of a selected node is to be increased. In response, where the total of the node power caps of all the nodes is equal to the system-wide power cap, the means reduces the node power caps of one or more nodes so that the total of the node power caps of all the nodes is less than the system-wide power cap. The means then increases the node power cap of the selected node, such that the total of the node power caps of all the nodes is equal to or less than the system-wide power cap.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
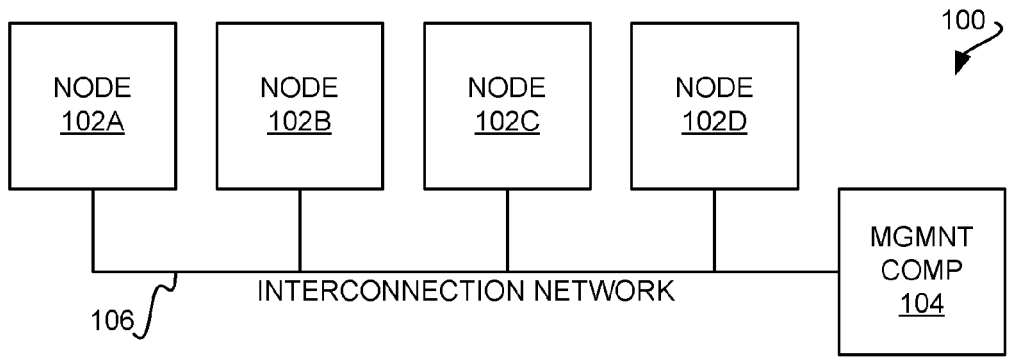
FIG. 1 is a diagram of a multiple-node system having a number of nodes, according to an embodiment of the invention.

FIG. 1 shows a multiple-node system 100, according to an embodiment of the present invention. The system 100 includes four nodes 102A, 102B, 102C, and 102D in the embodiment of FIG. 1, which are collectively referred to as the nodes 102. However, more generally, there are at least two nodes 102, such as tens, hundreds, or even thousands of the nodes 102. The system 100 also includes a management component 104, which may be implemented in software, hardware, or a combination of software and hardware. The management component 104 and the nodes 102 are interconnected by an interconnection network 106 in one embodiment.

In one embodiment, each of the nodes 102 is a separate computing device, such as a server computing device, which includes one or more processors, memory, storage devices, and/or other types of components. In one embodiment, each of the nodes 102 is a blade computing device that is inserted into a shared or common chassis. In another embodiment, the nodes 102 include both computing device nodes and storage device nodes, installed within a shared or common chassis. In one embodiment, each of the nodes 102 includes one or more processors, where all the nodes 102 are implemented on a single integrated circuit (IC), such that the system 100 is a multiple-processor core system. In other embodiments, the nodes 102 are implemented in other ways as well.

The management component 104 manages the power utilization of the multiple-node system 100 as a whole as well as the power utilization of the individual nodes 102 of the system 100. In particular, the system 100 has a system-wide power cap that specifies the maximum power that the system 100 is able to utilize overall. Furthermore, each of the nodes 102 has a node power cap that specifies the maximum power that the node is able to individually utilize. The individual node power cap of one node may be equal to or different than the individual node power caps of the other nodes. In general, the management component 104 modifies the individual node power caps so that the nodes 102 have the power that they need, while ensuring that the system-wide power cap is not violated.

Figure 2:
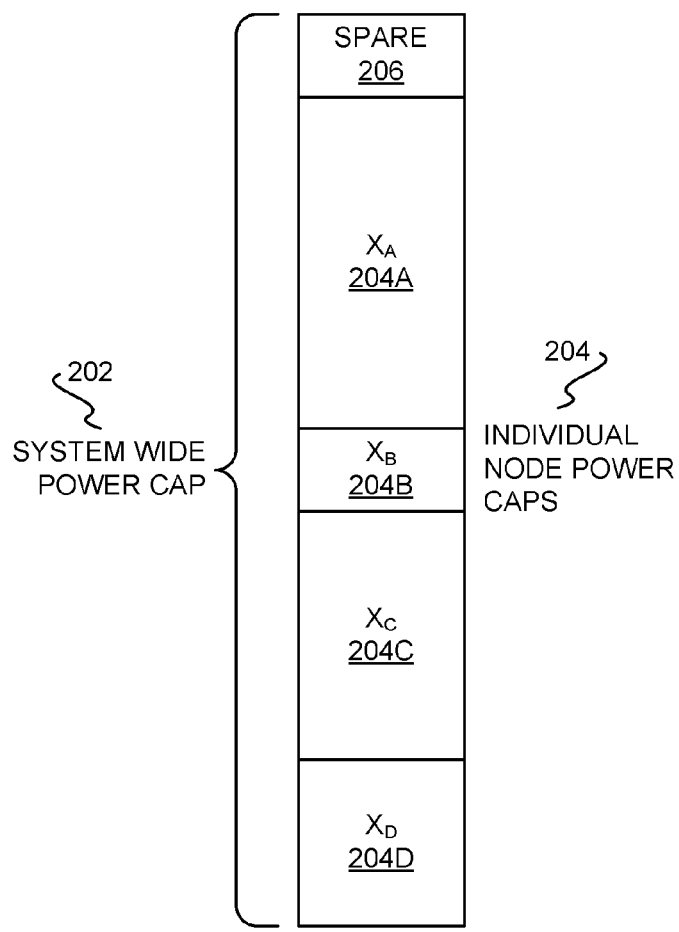
FIG. 2 is a diagram depicting node power caps of the nodes of a multiple-node system and a system-wide power cap of the multiple-node system, according to an embodiment of the invention.

FIG. 2 illustratively depicts the relationship between the system-wide power cap 202 of the multiple-node system 100 and the individual node power caps 204 of the nodes 102 of the system 100, according to an embodiment of the invention. The system-wide power cap 202 is specified as Y in FIG. 2. The individual node power caps 204 include node power caps 204A, 204B, 204C, and 204D, corresponding to the nodes 102A 102B, 102C, and 102D, respectively, and which are specified as $X_A$, $X_B$, $X_C$, and $X_D$, respectively, in FIG. 2.

The system-wide power cap 202 is related to the individual node power caps 204 such that $X_A+X_B+X_C+X_D \leq Y$. That is, the total of all the node power caps 204 is always less than or equal to the system-wide power cap 202, and is never greater than the system-wide power cap 202. Furthermore, if the total of all the node power caps 204 is less than the system-wide power cap 202 (i.e., $X_A+X_B+X_C+X_D<Y$), then there is spare power capacity 206 that is not currently assigned to any of the nodes 102, as is specifically depicted in FIG. 2. By comparison, if the total of all the node power caps is equal to the system-wide power cap 202 (i.e., $X_A+X_B+X_C+X_D=Y$), then there is no spare power capacity 206.

The management component 104 generally manages the individual node power caps 204 of the nodes 102 as follows, in relation to an example in which the node 102A needs to have its node power cap 204A increased by an amount Z, such that the desired $X_A$ equals the current $X_A$ plus Z. Where the total of all the node power caps 204 is less than the system-wide power cap 202 (i.e., the current $X_A+X_B+X_C+X_D<Y$), and the spare power capacity 206 is greater than or equal to Z, the management component 104 increases the node power cap 204A by the amount Z, without changing any other of the node power caps 204. This is permitted, because the current $X_A+Z+X_B+X_C+X_D \leq Y$.

However, where the total of all the node power caps 204 is equal to the system-wide power cap 202 (i.e., the current $X_A+X_B+X_C+X_D=Y$), or the total of all the node power caps 204 is less than the system-wide power cap 202 by less than Z (i.e., the current $Y-X_A+X_B+X_C+X_D<Z$), then the management component 104 cannot increase the node power cap 204A by the amount Z without changing any other of the node power caps 204. This is because if the node power cap 204A is increased by Z without changing any other of the node power caps 204, then the current $X_A+Z+X_B+X_C+X_D>Y$. As such, the system-wide power cap 202 is violated.

In this situation, therefore, the management component 104 decreases the node power cap for one or more of the other nodes 102, so that it can increase the node power cap 204A for the node 102A. For example, in one embodiment the management component 104 decreases the node power cap 204B, represented by $X_B$, of the node 102B by an amount V. The new $X_B$ equals the current $X_B$ minus V. The amount V is selected so that the current $X_A+Z+$the current $X_B-V+X_C+X_D \leq Y$. That is, the amount V by which the node power cap 204B is decreased is selected so that the node power cap 204A can be increased by the amount Z and such that the system-wide power cap 202 is not violated.

Figure 3:
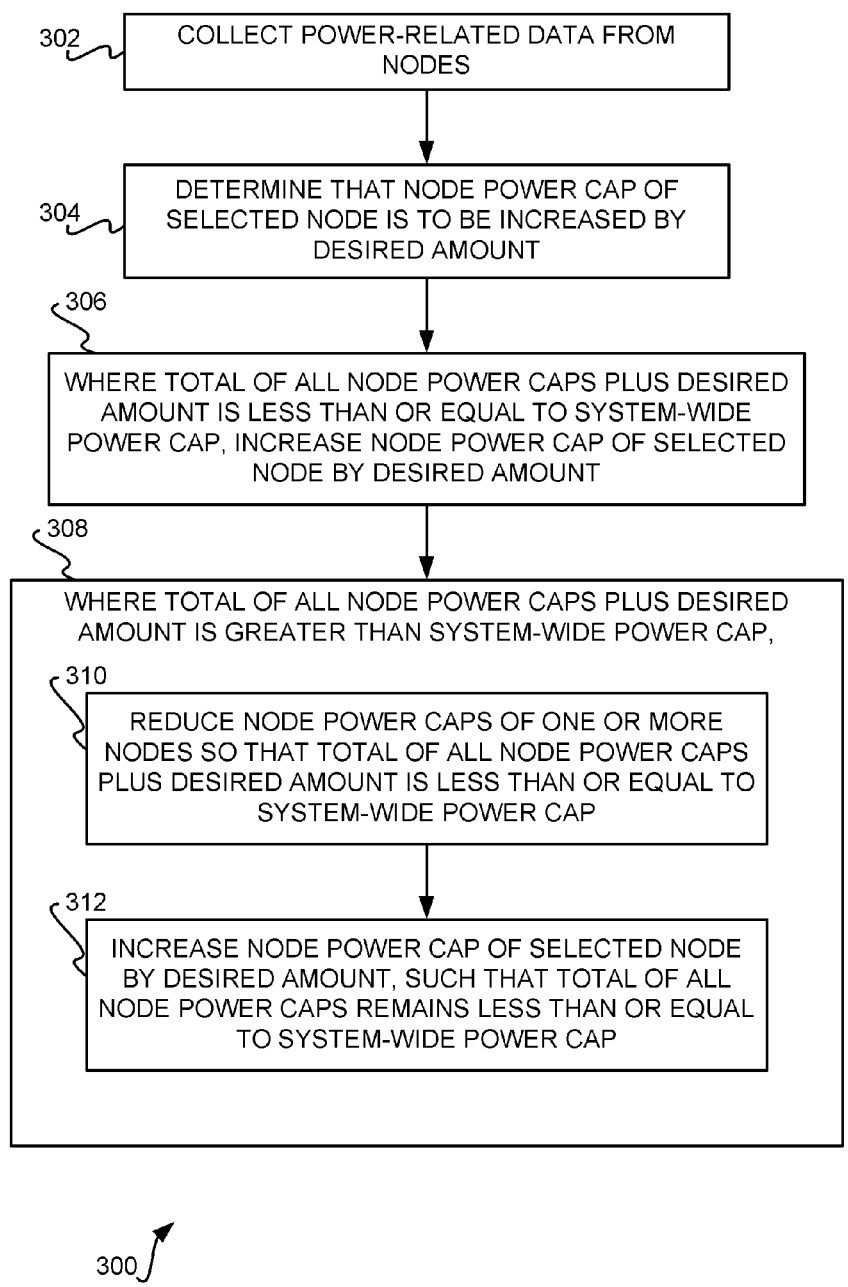
FIG. 3 is a flowchart of a method for managing power utilization of a multiple-node system having a number of nodes, according to an embodiment of the invention.

FIG. 3 shows a method 300 that is performed at least in part by the management component 104 to manage the power utilization of the multiple-node system 100 in relation to the system-wide power cap 202 and the individual node power caps 204, according to an embodiment of the invention. Power-related data is constantly or periodically collected from the nodes 102 throughout performance of the method 300 (302). Such power-related data includes the node power caps 204, and/or the currently utilized power levels of the nodes 102. For example, the node power cap for a given node is specified as T, but this does not mean that the given node is currently using an amount of power equal to T. Rather, the given node currently uses an amount of power $S \leq T$.

The method 300 determines at some point that the node power cap of a selected node is to be increased by a desired amount (304). In one embodiment, for example, the data collected in part 302 is analyzed to determine whether the node power caps of the nodes 102 are to be increased. Based on this analysis, the method 300 concludes that the power code of the selected node is to be increased by the desired amount. For example, the method 300 may determine that the selected node's current power utilization frequently hits up against its node power cap, such that desirably the node power cap for the selected node is increased so as not to hinder performance of the selected node.

In another embodiment, a request is received from the selected node to increase the node power cap of the selected node. For example, the selected node itself may determine that to achieve a desired performance level, its node power cap has to be increased. An application computer program currently running on the selected node makes this determination in one embodiment. Therefore, the selected node in this example sends a request that its node power cap be increased.

In another embodiment, it is determined that a workload currently being fulfilled by the selected node requires additional power to satisfy the workload's requirements. A workload is generally defined as any arbitrary grouping of one or more processes. Not all the processes currently being executed on the selected node have to be included in a workload. A workload is particularly defined in one embodiment as encompassing those processes that are associated with a particular workflow. In one embodiment, a workflow is a representation of business logic, such that the implementation of the business logic by process(es) of computer program(s) achieves realization of the business logic. A workload in this embodiment is the collection of processes that implement the business logic of a corresponding workflow.

In another embodiment, a workload is particularly defined as a collection of processes that satisfy a particular policy. One example of a policy specifies all processes associated with a given computer program or given computer programs. A second example of a policy specifies all processes associated with a particular workflow, in accordance with the definition of a workload in the previous paragraph. A process as used herein may be generally defined as an execution instance of a computer program or of a part of a computer program.

Where the total of all the node power caps 204 of the nodes 102, plus the desired amount by which the node power cap for the selected node is to be increased, is less than or equal to the system-wide power cap 202, then the node power cap of the selected node is increased by the desired amount (306). However, where the total of all the node power caps 204 of the nodes 102, plus the desired amount by which the node power cap for the selected node is to be increased, is greater than the system-wide power cap 202, then the following is performed in one embodiment (308). First, the node power caps of one or more nodes are reduced so that the total of all the node power caps 204 of the nodes 102, plus the desired amount by which the node power cap for the selected node is to be increased, is less than or equal to the system-wide power cap 202 (310).

In one embodiment, part 310 of the method 300 is performed by selecting the one or more nodes of which the node power caps are to be reduced. In one embodiment, a given node of the multiple-node system 100 is selected for reduction in its node power cap where the given node is currently utilizing less power than the amount permitted by its node power cap. In another embodiment, a given node of the system 100 is selected for reduction in its node power cap where the given node has a lower priority than the priority of the selected node. In this embodiment, the nodes all have priorities, where some nodes have higher priorities than other nodes, indicating that the higher-priority nodes are to be given priority over the lower-priority nodes.

In another embodiment, a given node of the multiple-node system 100 is selected for reduction in its node power cap based on the power usage history of the given node. For example, the power usage history of the given node may suggest that typically the given node utilizes significantly less power than permitted by its node power cap. In another embodiment, a given node of the multiple-node system 100 is queried to determine whether it should be selected for reduction in its node power cap. In this embodiment, the given node itself determines whether it can have its node power cap reduced, rather than the management component 104 making this determination.

Once the one or more nodes have had their node power caps reduced so that the total of all the node power caps 204 of the nodes 102, plus the desired amount by which the node power cap of the selected node is to be increased, is less than or equal to the system-wide power cap 202, the method 300 increases the node power cap of the selected node by the desired amount (312). In this way, the system-wide power cap 202 is not violated. That is, after reducing the node power caps of the one or more nodes in part 310 and after increasing the node power cap of the selected node in part 312, the total of all the node power caps 204 of the nodes 102 remains less than or equal to the system-wide power cap 202.

Figure 4:
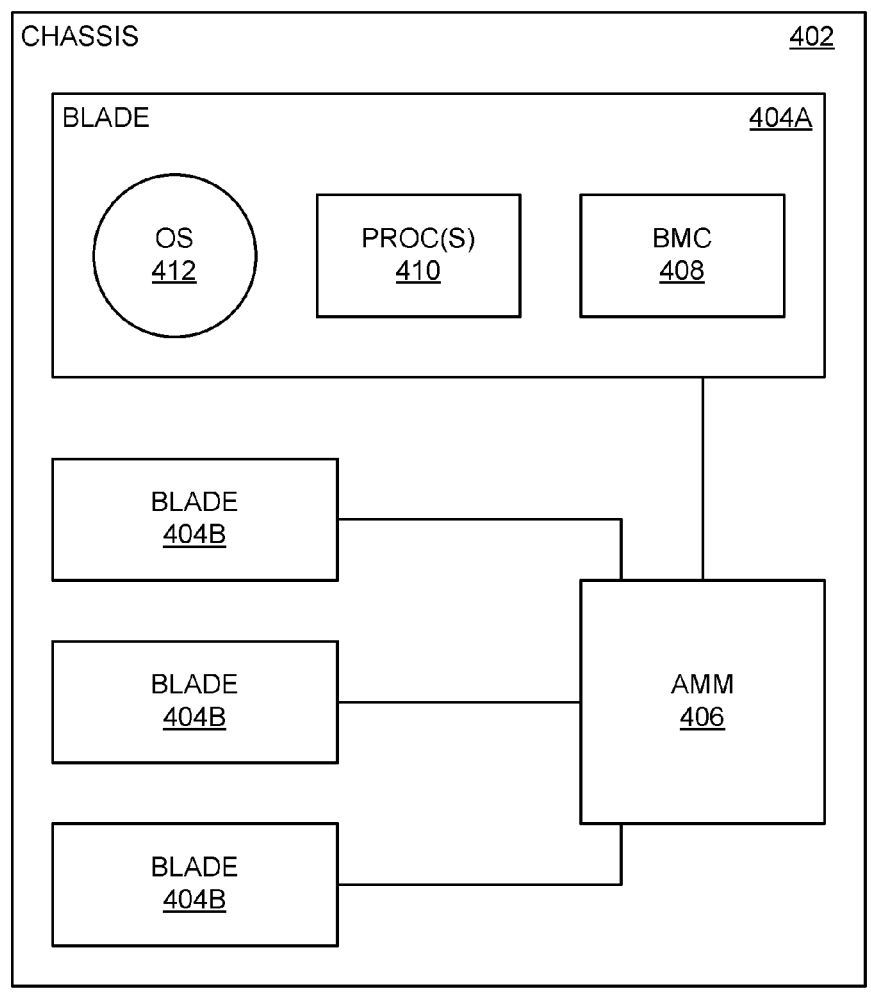
FIG. 4 is a diagram of a particular type of a multiple-node system, consistent with but more detailed than the system of FIG. 1, according to an embodiment of the invention.

FIG. 4 shows a specific type of multiple-node system 400, according to an embodiment of the present invention. The system 400 is more detailed than but consistent with the multiple-node system 100 of FIG. 1 that has been described. The system 400 includes a chassis 402, within which four blade computing devices 404A, 404B, 404C, and 404D, collectively referred to as the blade computing devices 404, are installed. The blade component devices 404 correspond to the nodes 102 of FIG. 1, and there are at least two such blade component devices 404 in general. The system 400 further includes an advanced management module (AMM) 406, which corresponds to the management component 104 of FIG. 1 in one embodiment.

The blade computing device 404A is depicted in exemplary detail as representative of all the blade computing devices 404. The blade computing device 404A includes a blade management controller (BMC) 408, one or more processors 410, and an operating system 412 executed by the processors 410. The blade computing device 404A in one embodiment includes other components, in addition to those depicted in FIG. 4, such as hardware, including memory, network interface cards, storage devices, and/or other types of hardware, and/or such as software, including application computer programs running on the operating system 412 and executed by the processors 410.

In one embodiment, the BMC 408 collects the power-related data from the blade computing device 404A and transmits this data to the AMM 406 to implement part 302 of the method 300 of FIG. 3. In one embodiment, the processors 410 each have what is referred to as a processor state, or pstate, limit, which corresponds to the node power cap of the blade computing device 404A. The pstate limit specifies the pstate, or processor state, at which the processors 410 can operate. Thus, the greater the pstate at which the processors 410 operate, the greater the performance of the processors 410, but the greater the power consumed by the blade computing device 404A.

In one embodiment, a processor governor implemented within the operating system 412 determines that the processors 410 have to exceed the pstate limit, and thus the node power cap of the blade computing device 402, as specified by the BMC 408, and conveys this information to the AMM 406 to implement part 304 of the method 300 of FIG. 3. In another embodiment, an application computer program running in relation to the operating system 412 determines that its response, performance, and/or service goals cannot be achieved unless the pstate of the processors 410 is increased past the pstate limit. The application computer program in this embodiment conveys this information to the AMM 306 in one embodiment, to implement part 304 of the method 300.

In one embodiment, resource management functionality implemented by the BMC 408 and/or by the AMM 406 determines that a given workload requires more processor power to satisfy the constraints imposed by the workload, to implement part 304 of the method 300 of FIG. 3. The AMM 406 thus reduces the node power cap of a selected blade computing device in parts 306 and 308 of the method 300. The AMM 406 in one embodiment performs the functionality that has been described in relation to parts 306, 310, and 312 of the method 300, for instance. For example, the AMM 406 in one embodiment queries the BMC 408 of the blade computing device 404A to determine whether the blade computing device 404A is able to operate at a lower node power cap. The BMC 408 in one embodiment in turn queries the processors 410 and/or the operating system 412 to make this determination.

In the multiple-node system 400, therefore, in one embodiment the AMM 406 communicates with the blade computing devices 404 via their respective BMC's, such as the BMC 408 of the blade computing device 402A. However, in another embodiment, the operating system 412, the processor governor implemented within the operating system 412, the processors 410, and/or the application programs running on the operating system 412 directly communicate with the AMM 406, without traversing the BMC 408 of the blade computing device 404A. In general, then, the embodiment of FIG. 4 provides a specific architecture by which the power management functionality of a multiple-node system, as has been described, is achieved.

It is finally noted that, although specific embodiments have been illustrated and described herein, it will be appreciated by those of ordinary skill in the art that any arrangement calculated to achieve the same purpose may be substituted for the specific embodiments shown. For example, rather than the management component 104 being implemented as the AMM 406 in the embodiment of FIG. 4, the management component 104 is also able to be a separate management component and not the same component as the AMM 406. The management component 104 in such instance is an independent entity that manages the overall power budget for just the blade computing devices 404 within the chassis 402, or for a number of devices or nodes including the devices 404 as well as other devices.

As such, in one embodiment, the management component 104 is implemented in a distributed and/or hierarchical manner. A collection of nodes that are to have their power usage managed is divided into separate groups of nodes. There is a management super-component that manages the power used by each group of nodes in total, and a management sub-component for each group of nodes that manages the power used by each node within the group of nodes in question.

For example, consider a situation in which there are twenty nodes divided into four groups of five nodes for each group. The management super-component in this case manages the power used by each group of five nodes, but does not specify how much power each node within each group is to use. Rather, for a given group of five nodes, a separate management sub-component manages the power used by each node of this group, where the total power used by all the nodes of the group is provided by the management super-component.

For example, the management super-component may specify that a given group of nodes can use a total amount of power P, but does not specify the amount of power that each node within the group can use. Rather, this is specified by the management sub-component for the group, which may specify power amounts $P_x$ for each node $x=1\ldots 5$. In this case, $P_1+P_2+P_3+P_4+P_5$ is less than or equal to P. In accordance with the foregoing, this patent application is thus intended to cover any adaptations or variations of embodiments of the present invention, such as the adaptation and variations described in this paragraph and the preceding three paragraphs. Therefore, it is manifestly intended that this invention be limited only by the claims and equivalents thereof.

I claim:

1. A method for managing power utilization of a multiple-node system having a plurality of nodes, comprising:
   in response to determining that a node power cap of a selected node of the plurality of nodes is to be increased, the node power cap of the selected node specifying a maximum power that the selected node is able to individually utilize,
      where a total of node power caps of all the nodes of the multiple-node system is equal to a system-wide power cap, the system-wide power cap specifying a maximum power that multiple-node system is able to utilize overall, the node power cap of each node specifying a maximum power that the node is able to individually utilize,
         reducing the node power caps of one or more nodes of the plurality of nodes so that the total of the node power caps of all the nodes of the multiple-node system is less than the system-wide power cap; and,
         increasing the node power cap of the selected node such that the total of the node power caps of all the nodes is equal to or less than the system-wide power cap,
   wherein reducing the node power caps of the one or more nodes of the plurality of nodes so that the total of the node power caps of all the nodes of the multiple-node system is less than the system-wide power cap comprises:
      selecting each of the one or more nodes of which the node power caps are to be reduced, by selecting a given node of the multiple-node system based on power usage history of the given node, the power usage history of the given node indicating that the given node has historically used less power than permitted by the node power cap of the given node.

2. The method of claim 1, further comprising, in response to determining that the node power cap of the selected node is to be increased,
   where the total of the node power caps of all the nodes of the multiple-node system is less than the system-wide power cap,
      increasing the node power cap of the selected node such that the total of the node power caps of all the nodes of the multiple-node system is equal to or less than the system-wide power cap.

3. The method of claim 1, further comprising collecting power-related data from the nodes of the multiple-node system, by one or more of:
   collecting the node power caps of the nodes; and,
   collecting currently utilized power levels of the nodes.

4. The method of claim 1, wherein determining that the node power cap of the selected node is to be increased comprises:
   collecting data from the nodes of the multiple node-system;
   analyzing the data to determine whether the node power caps of the nodes are to be increased; and,
   concluding that the node power cap of the selected node is to be increased based on analyzing the data.

5. The method of claim 1, wherein determining that the node power cap of the selected node is to be increased comprises:
   receiving a request from the selected node to increase the node power cap of the selected node.

6. The method of claim 1, wherein determining that the node power cap of the selected node is to be increased comprises:
   determining that a workload being fulfilled by the selected node needs additional power to satisfy requirements of the workload.

7. A multiple-node system having a system-wide power cap specifying a maximum power that the multiple-node system is able to utilize overall, comprising:
   a plurality of nodes, each node having a node power cap specifying a maximum power that the node is able to individually utilize; and,
   a management component to determine that a node power cap of a selected node of the plurality of nodes is to be increased, and where a total of the node power caps of all the nodes is equal to the system-wide power cap, reduce the node power caps of one or more nodes of the plurality of nodes and increase the node power cap of the selected node,
   wherein the node power caps of the one or more nodes are reduced so that the total of the node power caps of all the nodes is less than the system-wide power cap,
   wherein the node power cap of the selected node is increased such that the total of the node power caps of all the nodes is equal to or less than the system-wide power cap, and
   wherein the management component is to reduce the node power caps of the one or more nodes by selecting each of the one or more nodes based on power usage history of the one more nodes the power usage history of the one or more nodes indicating that the one or more nodes have historically used less power than permitted by the node power caps of the one or more nodes.

8. The multiple-node system of claim 7, wherein each node comprises at least a processor.

9. The multiple-node system of claim 7, wherein each node comprises a blade computing device having a blade management controller (BMC), and the management component comprises an advanced management module (AMM) for the plurality of nodes.

10. An article of manufacture comprising:
a non-transitory computer-readable medium; and,
means in the medium for managing power utilization of a multiple-node system having a plurality nodes by:
  in response to determining that a node power cap of a selected node of the plurality of nodes is to be increased, the node power cap of the selected node specifying a maximum power that the selected node is able to individually utilize,
    where a total of node power caps of all the nodes of the multiple-node system is equal to a system-wide power cap, the system-wide power cap specifying a maximum power that multiple-node system is able to utilize overall, the node power cap of each node specifying a maximum power that the node is able to individually utilize,
  reducing the node power caps of one or more nodes of the plurality of nodes so that the total of the node power caps of all the nodes of the multiple-node system is less than the system-wide power cap; and,
  increasing the node power cap of the selected node such that the total of the node power caps of all the nodes is equal to or less than the system-wide power cap,
wherein means reduces the node power caps of the one or more nodes of the plurality of nodes so that the total of the node power caps of all the nodes of the multiple-node system is less than the system-wide power cap by a given node of the multiple-node system based on power usage history of the given node, the power usage history of the given node indicating that the given node has historically used less power than permitted by the node power cap of the given node.

* * * * *